Aug. 14, 1928.
C. S. WEYANDT
1,680,311
RECIPROCATING MOTOR
Filed Feb. 1, 1926
3 Sheets-Sheet 1
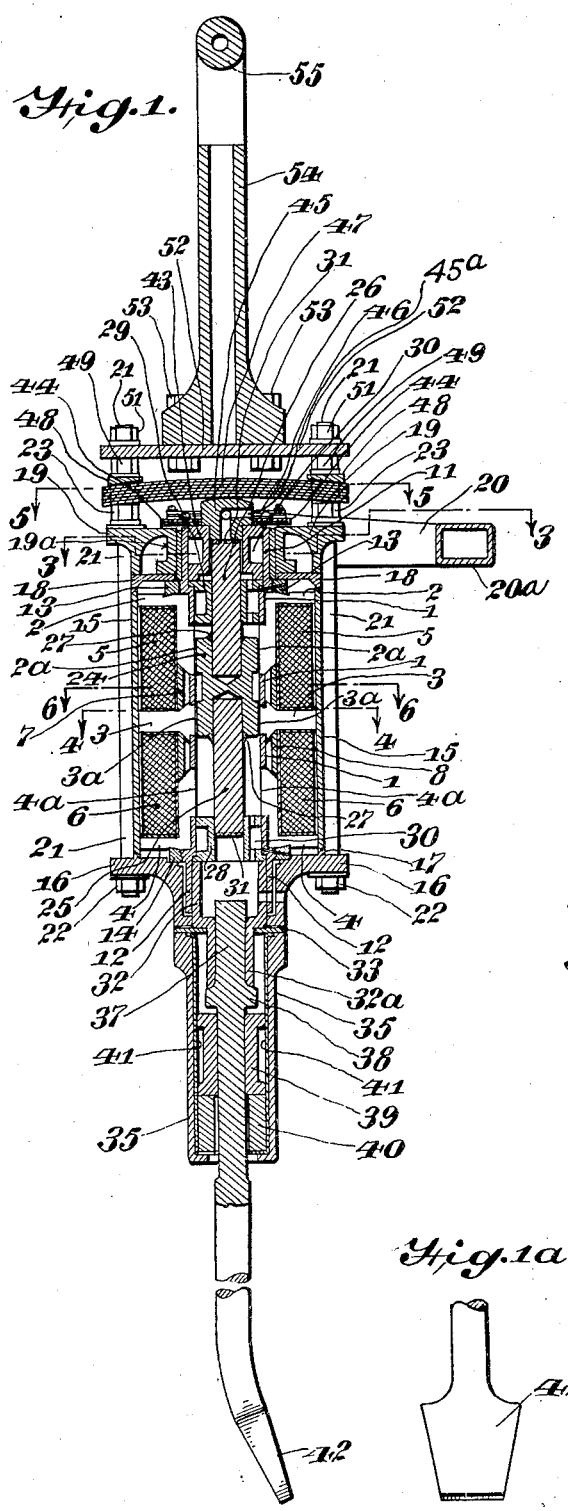
Fig. 1.
Fig. 1a.
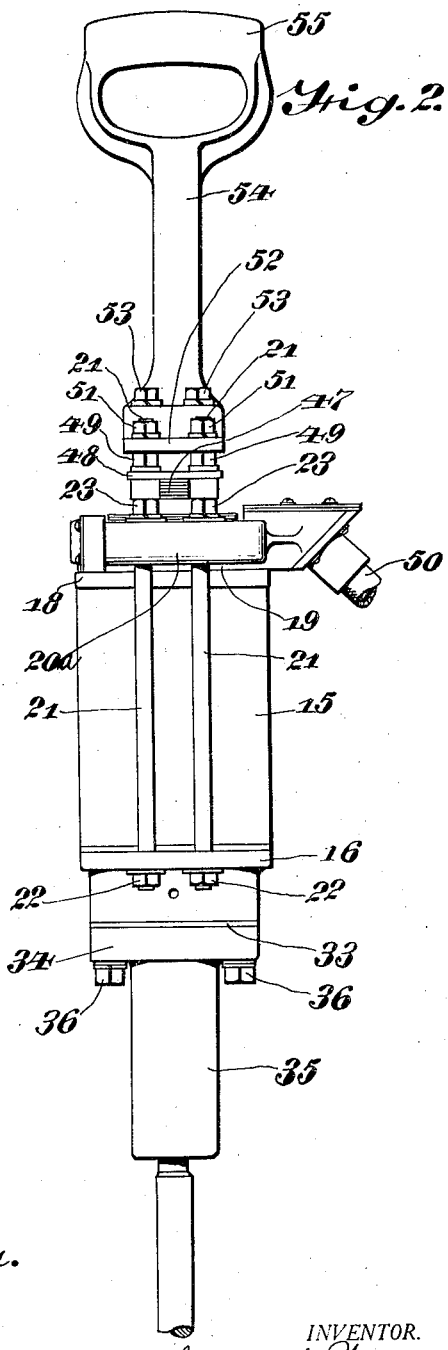
Fig. 2.
INVENTOR.
Carl S. Weyandt
Cornelius D. Ehret
BY
his ATTORNEY.

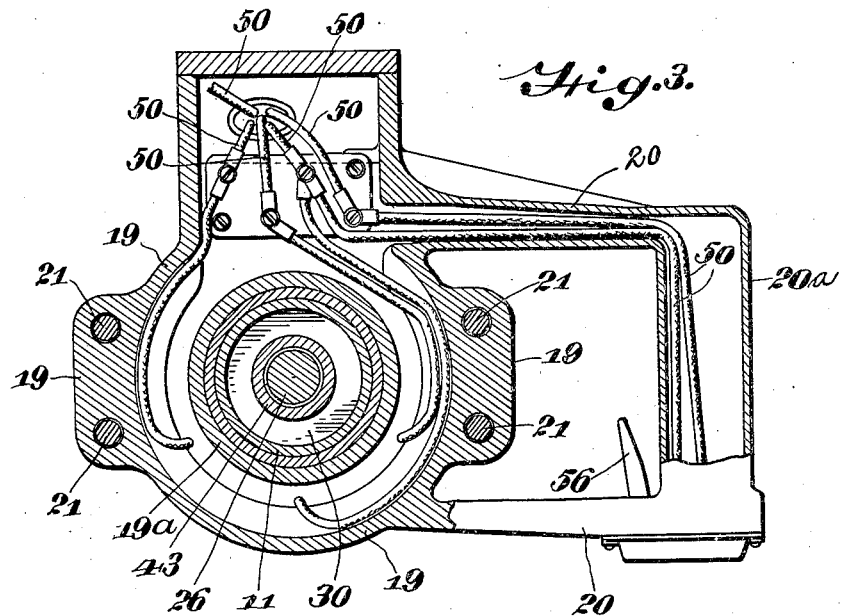
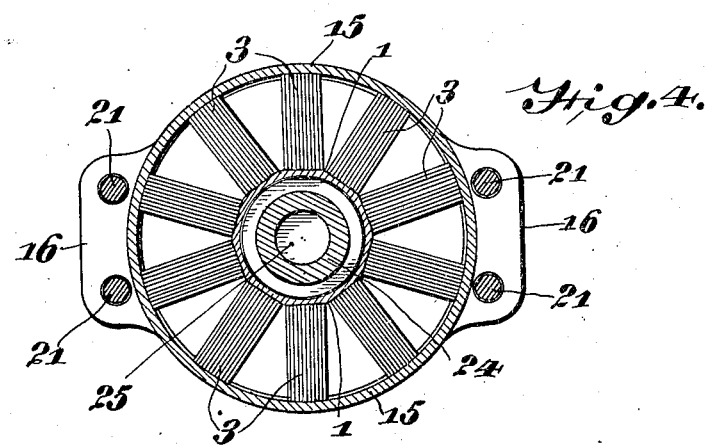
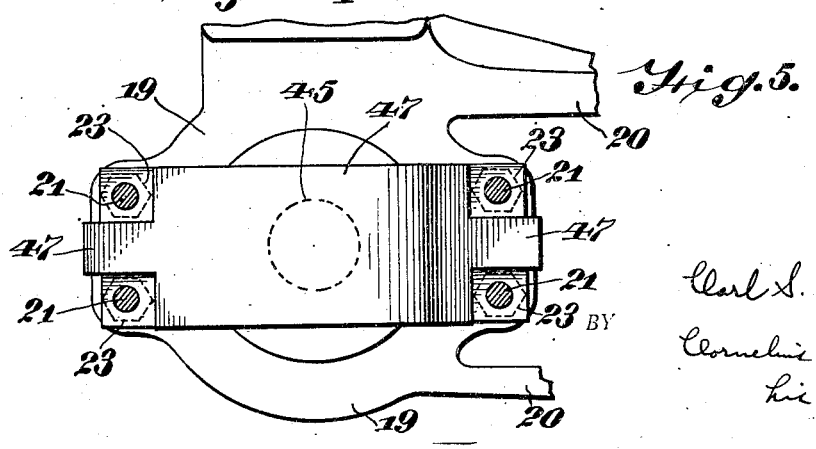

Aug. 14, 1928. 1,680,311
C. S. WEYANDT
RECIPROCATING MOTOR
Filed Feb. 1, 1926   3 Sheets-Sheet 3
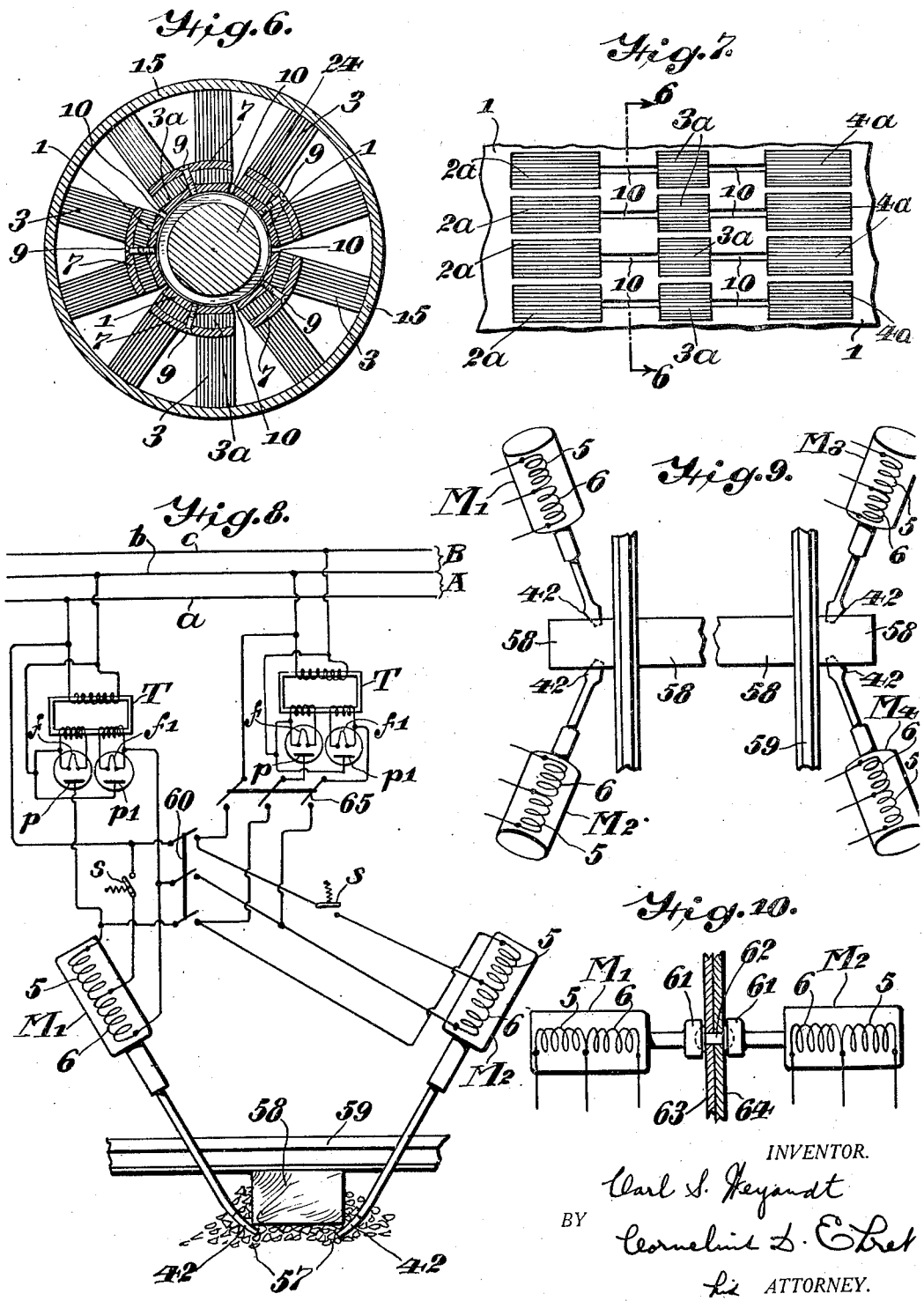

Patented Aug. 14, 1928.

1,680,311

UNITED STATES PATENT OFFICE.

CARL S. WEYANDT, OF PITTSBURGH, PENNSYLVANIA, ASSIGNOR TO CENTRAL ELECTRIC TOOL COMPANY, OF PITTSBURGH, PENNSYLVANIA, A CORPORATION OF PENNSYLVANIA.

RECIPROCATING MOTOR.

Application filed February 1, 1926. Serial No. 85,245.

My invention relates to electric motors of the reciprocating type, particularly such as are utilizable as percussive tools for drilling, cutting, chipping, riveting or otherwise working metal, stone, concrete and the like, and particularly for tamping railway ballast, or earth, as around poles or posts, or such as backfill in ditches.

In accordance with my invention, a tool of the character referred to is provided with a handle at or adjacent one end of the motor or motor casing, and the several current-conducting leads extend to or adjacent the handle or handle structure in such relation to the buffer spring which lies axially beyond the motor or the point to which the conducting leads extend, that the buffer spring may be replaced or repaired without disturbing the conducting leads; more particularly in accordance with my invention, a tamping or similar tool, of the character referred to, is provided with two handles, one of them the aforesaid handle at or adjacent the end of the motor or motor casing, and which constitutes a side handle, and an upper or top handle more remote from the motor so disposed with respect to the side handle that the buffer spring lies between the upper and side handles.

Further in accordance with my invention, in a tool of the character referred to, where high power long strokes, generally at low frequency, are required, as in ballast tamping, riveting, etc., the weight of the moving system is made small in order that there shall be as little lag as possible in starting and during acceleration, so that the velocity attained just before impact shall be as high as possible for, as between weight or mass and velocity, weight or mass may be to some extent sacrificed in favor of velocity, since the kinetic energy at impact is directly proportional to the weight or mass, and proportional to the square of the velocity. The reduction of mass or weight is in part obtainable by utilizing a relatively short magnetizable core, and by bringing the air gaps of the magnetic circuits of the operating windings close to each other; and in a composite moving system, comprising a magnetizable core proper, in addition to guide rods thereon, the ratio of the weight of the magnetic core itself to the weight of the composite system, comprising core and guide rods, is made small to ensure reduction of slip or to ensure early starting. The magnetic core proper may be further lightened by a circumferential groove or grooves between its ends, particularly a groove of considerable length midway between the core ends, such groove or grooves having the further advantage of increasing the reluctance within the air gap path itself between pole tips, but this reluctance should not be increased to the point of allowing flux to pass from pole tip to pole tip outside of the magnetic core, and so in effect take a leakage path. In any event, the reluctance of the flux path in the core should not be so great as to effect excessive saturation.

Further in accordance with my invention, the moving system may comprise a magnetic core member proper having thereon guide rods of non-magnetic material, whose impact ends are shod with hard impact-withstanding metal, as Stellite or equivalent.

Further in accordance with my invention, guide bushings in which the aforesaid guide rods bear are preferably provided with external recesses or circumferential grooves containing fibrous or equivalent material saturated with lubricant which is slowly delivered to the internal guide surface through suitable passages.

Further in accordance with my invention, in a reciprocating motor in which the moving system is enclosed in a tube or barrel to which laminations of the magnetic circuit are held by clamping structure, the waste of energy by current induced by the fluctuating magnetic field is reduced by slotting the barrel and/or clamping structure in such positions and to such extents as to materially interrupt or greatly lengthen the paths in which currents would be induced, and more particularly, the slots in the clamps and barrel are brought substantially into register with each other.

Further in accordance with my invention, an air gap, with respect to which the reciprocating core moves, is disposed nearer one than the other of groups of magnetizable elements spaced from each other longitudinally of the movement of the core, and more particularly where the core coacts with a plurality of air gaps spaced from each other longitudinally of the movement of the core, the elements making up the magnetic circuits are so disposed that the longitudinal spacing of the air gaps is diminished, whereby there may be utilized a core of less weight operating at higher velocity.

Further in accordance with my invention there is provided exteriorly of the motor unit itself, a buffer structure to effect easy replacement if broken, and to reduce likelihood of breakage by distribution of impact.

Further in accordance with my invention, a structure is provided embodying guide bearings for the core or reciprocating element of an electric motor, whereby frictional losses are diminished and the wear on the internal motor structure is substantially reduced.

Further in accordance with my invention, a stop member subject to impact of the reciprocating element bears against the resilient buffer structure, and is provided with means for permitting passage of lubricant therethrough.

Further in accordance with my invention, particularly in electric tampers or the like, that end of the tamper bar or other tool which receives the impact of the moving system is in such position with respect to the moving system of the motor, when the tool is in its lowermost position, as when the tool is raised from the work, that the magnetic core may not pass too far out of the magnetic field, with the result that the moving system will continue to reciprocate continuously even when the tool is withdrawn or raised from the work Further in accordance with my invention, for long high power strokes, particularly in the case of a tie tamper, there is utilized alternating current of low frequency, from about 15 to about 27 cycles per second, with an optimum of about 20 or 21 cycles per second; and further in accordance with my invention, in the utilization of such low frequency in the production of long high power strokes, the highest efficiency is obtainable when utilizing a light moving system, of which the magnetic core proper is short, in association with air gaps closely approaching each other, and when the parts are otherwise proportioned generally as hereinafter described.

Further in accordance with my invention, the barrel or tubular member within which the moving system is disposed is constituted of metal which is light in weight and yet of great strength, such as an aluminum alloy, so reducing the weight of the tool, and, more particularly, because of its relatively high specific resistance reducing the losses represented by currents, including eddy currents, induced in the tubular member by the fluctuating magnetic field in which it is positioned; and further in accordance with my invention, other parts of the motor structure, such as the members which clamp the laminations, and the members upon the barrel or tubular member, are similarly preferably made of like alloy.

Further in accordance with my invention, the wire or conductor constituting the motor winding or windings is of aluminum, thereby greatly decreasing the weight of the motor and the inertia of the windings, and in addition, because of the greater resistance of the winding as compared with one of copper, the ratio of resistance to inductance of a motor winding is increased, thereby increasing the power factor, and, particularly when laminations are common to the two magnetic circuits, the overlap of the magneto-motive-forces impressed upon the common laminations is reduced, and the losses in those laminations are reduced.

This application is in part a continuation of my application Serial No. 19,311, filed March 30, 1925, in which are made claims to the particular exteriorly disposed spring buffer structure and the lubricating core stop therein disclosed, while herein are made claims generic to the disclosures of both applications and claims specific to the particular buffer structure and lubricating core stop herein disclosed.

My invention resides in features, structure, arrangement, combination, proportions and operation of the character hereinafter described and claimed.

For an illustration of one of the various forms my structure may take, and of several modes of use, reference is to be had to the accompanying drawings, in which:

Fig. 1 is a vertical sectional view, partly in elevation, of a ballast or tie tamper embodying my invention.

Fig. 1ª is a fragmentary elevational view of the lower end of the tapping bar.

Fig. 2 is a side elevational view of the structure shown in Fig. 1.

Fig. 3 is a horizontal sectional view, partly in plan, taken on the line 3—3 of Fig. 1.

Fig. 4 is a horizontal section, partly in plan, taken on the line 4—4 of Fig. 1.

Fig. 5 is a fragmentary horizontal sectional view, largely in plan, taken on the line 5—5 of Fig. 1.

Fig. 6 is a horizontal sectional view, partly in plan, taken on the line 6—6 of Fig. 1, and on line 6—6 of Fig. 7.

Fig. 7 is a fragmentary plan view of the barrel and pole tips, developed into a plane.

Fig. 8 is a diagrammatic view of circuit arrangements utilizable with a plurality of reciprocating motors for effecting blows either in phase with each other, or dephased.

Fig. 9 is a plan view of a railway tie with a plurality of tampers operating thereon.

Fig. 10 is a view, partly in section, illustrating the application of my invention to riveting.

Referring to the drawings, 1 is a barrel or tubular member, of metal, such as brass or bronze, and preferably of a light weight alloy, as an aluminum alloy, such as duralumin, of sufficiently high tensile strength, for effecting both decrease in weight of the motor, and to reduce the loss represented by currents induced therein by the fluctuating magnetic field with which it is associated, this reduction of induced current loss being due to the fact that the specific resistance of the alloy is relatively high.

Disposed upon the exterior of the member 1 are the circumferentially disposed groups of laminæ 2, 3 and 4, of silicon steel or other suitable magnetic core material. The central laminations 3 are common to the magnetic circuits of the two windings or solenoids 5 and 6, and, as indicated in Figs. 4 and 6, are comprised in a series of circumferentially arranged groups whose inner ends rest upon the flat external sides of the member 1. The laminations 2 and 4 are similarly disposed in circumferential groups upon external flat surfaces of the member 1.

As indicated in Figs. 1 and 7, the inner ends or pole tips of the laminations extend through openings in the member 1, the inner ends of the laminations coming flush with the inner cylindrical wall of the member, thereby extending further than heretofore toward the axis of barrel 1. As indicated, these pole tips 2ª of the laminations 2 and the pole tips 4ª of the laminations 4 may have greater length, axially of the member 1, than the pole tips 3ª of the common or central laminations 3.

Furthermore, the pole tips 2ª and 4ª extend a considerable distance toward the pole tips 3ª, thereby bringing close together the two air gaps one of them between the pole tips 2ª and 3ª, and the other between the pole tips 4ª and 3ª. So bringing the air gaps close together permits the use of a relatively shorter magnetizable reciprocating core member 24, thereby contributing to a light movable core or core system, making possible also long and powerful strokes which are particularly advantageous in some fields of use, such as the tamping of ballast around or under railway ties, riveting, and other relations, and shortening the magnetic circuit of the motor as a whole, and particularly through the reciprocating core member 24.

External to the member 1, and in the space between the laminations 2 and 3 and in the space between the laminations 3 and 4, are the clamping members 7 and 8 of any suitable material, preferably a light alloy of suitably high specific resistance, such, for example, as the aluminum alloy constituting the barrel 1, whereby not only is the weight of the motor reduced, but the waste currents induced in the members 7 and 8 are decreased. The pole tip ends of the laminations are bevelled as indicated, as also are the ends of the clamping members 7 and 8, which latter are held by screws 9, Fig. 6, to the barrel member 1.

The clamping members 7 and 8 are circumferentially discontinuous, as indicated in Fig. 6 respecting members 7, there being one clamping member for one or more groups of laminations. In the example indicated in Fig. 6, there is a clamping member 7 for each pair of laminations. This circumferential discontinuity of the clamping members reduces the waste currents induced in them by the fluctuating magnetic field. In addition, locally, as between the lamination pole tips, the barrel 1 is slotted at 10, as indicated in Figs. 6 and 7, similarly for the purpose of reducing the waste currents induced in the barrel member 1, and particularly by increasing the length of the path that any currents induced must take. As indicated in Fig. 6, the gaps between neighboring clamping members, as 7, and the slots 10 in the barrel 1, are substantially in register, in the sense that they are so positioned with respect to each other that the circuitous path for induced currents in the barrel and to the clamping member and return to the barrel is broken up and shortened. The discontinuity of the clamping members, and the slotting of the barrel 1, both contribute to reduction of induced current losses, and these losses are further minimized by bringing the slots 10 and the gaps between the clamping members into a relation of the character indicated in Fig. 6.

The member or barrel 1, the laminations 2, 3 and 4, and the windings 5 and 6, constitute a unit separately assembled as such. At its opposite ends the barrel 1 has portions 11 and 12 of greater diameter. Upon the member 11 is threaded the annular nut 13 constituting a somewhat beveled abutment against which engage complementarily beveled edges of the laminations 2. Upon the member 12 is similarly threaded and beveled an annular nut 14 thrusting against the complementarily beveled laminations 4, holding the different groups of laminations as a unit upon the barrel and causing the beveled edges of the clamping members 7 and 8 to engage or be engaged by the associated beveled laminations, the beveling of nuts and laminations forcing the laminations toward the barrel 1. The winding 5 is held between the laminations 2 and 3, and winding 6 between laminations 3 and 4, and the windings constitute with the laminations 2, 3, 4, clamps 7, 8 and barrel 1 a unit which is removable as such from the motor structure.

An enclosing casing 15, of silicon steel or other suitable magnetizable material, is comprised in the magnetic circuits and is engaged or closely approached upon its inner side by the outer ends of the laminations 2, 3 and 4.

On the lower end of the motor is the end plate or closure member 16 surrounding the lower end of the member 12 of the barrel 1 and abutting against the annular nut 14, and having an annular beveled rib 17 abutting against the complementarily beveled end of the casing 15.

At the upper end of the motor there engages upon the upper end of the annular nut 13 a member 18 whose outer and lower end is beveled to engage the complementarily beveled end of the casing 15. Member 18 is preferably of fibre or fibrous material which, because of its resiliency, flexibility or slight compressibility, makes possible compensation for unevenness or tolerances in the various parts clamped together. Upon the upper side of the member 18 engages the upper end plate or closure member 19, attached to or integral with which is the side handle structure comprising the members 20, 20 and the hand grip 20ᵃ, all in a plane normal to the path of movement of core 24. Through the members 16 and 19 pass the longitudinally extending tie rods 21, upon whose lower ends are threaded the nuts 22 and upon whose upper ends, engaging the member 19, are threaded the nuts 23. Taking up upon the nuts draws the members 16 and 19 forcibly towards each other, thereby clamping members 16 and 18 to the casing 15 and also holding the aforesaid unit, comprising barrel, laminations, clamps and windings, in fixed position within the casing 15.

The reciprocating core 24 consists of silicon steel or other suitable magnetizable material, relatively short when utilized in a long stroke motor, and particularly when utilized in co-operation with closely approaching air gaps above referred to. In the example illustrated, the core 24 proper does not bear upon the inner wall of the barrel 1, but is carried by guide rods 25 and 26 extending at their adjacent ends into bores in the member 24 and welded thereto at 27, by any suitable welding material, as suitable iron or equivalent. The rods 25 and 26 are of non-magnetic material, preferably non-magnetic steel, such as manganese steel containing sufficient manganese, as of the order of 11 to 13 per cent, to render the material non-magnetic. Or these members may be of rezistal, a non-magnetic alloy of iron, nickel, chromium and silicon. The rod 25 is guided and reciprocates in the bearing bushing 28, and the rod 26 is guided and reciprocates in the bearing bushing 29, both bushings disposed and held within the barrel 1. These bushings may be of any suitable material, as oilless bushings, such as wood or other suitable material impregnated with lubricant; porous bronze saturated with lubricant; a compressed and bound mixture of bronze powder and graphite; a solid metal or bronze bushing with a graphite liner or insert; or, as indicated, of solid metal, such as bronze, having external recesses, or peripheral grooves 30, in which may be disposed waste or other fibrous material saturated with lubricant, which then passes inwardly to the bearing surfaces through suitable apertures, not shown. When the rods 25 are non-magnetic, as preferred, they are generally necessarily of a material which does not withstand impact or which may not be hardened by heat treatment or otherwise. Accordingly, upon the lower or impact end of the rod 25 and upon the upper or impact end of the rod 26 are welded or secured disks 31, of Stellite or equivalent hard material which does not deform or yield under the impacts incidental to the use of the motor.

The lower bearing bushing 28 is held in position by the upper end of the tubular member 32, which is in turn held in place by the plate 33 held by the flange 34 of the tool holder 35 secured to the member 16 by bolts or cap screws 36, Fig. 2. The member 32 has a portion 32ᵃ of reduced diameter extending downwardly through the plate 33, and has a socket of polygonal cross section in which is received the upper end 37 of the tool shank, of similar polygonal cross section preventing the tool from turning when in use. Upon the shank of the tool is the collar 38, which is confined between the lower end of the socket member 32ᵃ and the upper end of the bushing 39, through which the tool shank extends downwardly through the rubber buffer 40 to the exterior and below the aluminum or aluminum alloy tool holder 35, which is provided with the tubular steel liner 41.

In the example illustrated, the tool is a railway tie tamper whose lower or work end is of any suitable shape, such as the usual tamper shape 42, preferably curving slightly from axial alignment with the motor or tool shank.

When the motor or tool as a whole is lifted away from the work, the tool will drop, causing the lower end of the collar 38 to rest upon the upper end of the bushing 39. When in this position, the upper end of the tool shank 37 is preferably in such position with respect to the air gap of the magnetic circuit, because of its length above the upper end of bushing 39, that when engaged by the rod 25 the magnetic core 24 proper will not pass beyond the influence of the magnetic field, and the moving system will, therefore, continue to reciprocate though the tool is withdrawn from the work. When the tool 42 is resting upon the ground or is in contact with the ballast or broken stone, the socket member 32ª will rest upon the upper side of the collar 38 and will continue in engagement with the collar 38, except for the lifting effect upon the motor caused by the impact delivered upon the upper end of the member 37.

At the upper end of the motor, within the upper end of barrel member 1, which extends into the central boss 19ª of member 19, is a bushing 43 abutting against the bearing bushing 29 and holding it in place. Engaging the upper end of the bushing 43 are the plates 44, secured to the member 19, holding the bushing 43 and the bushing 29 in place, the plates 44 being spring-like or yielding if desired. The anvil or impact member 45, of hard steel or equivalent, taking the impact of the moving system upon its return stroke, is short, light in weight, and extends partly into the bushing 43, within which the rod 26 freely passes, and is visible by the operator. A lubricating passage 45ª extends transversely and longitudinally of the axis of said impact member from the exterior thereof and communicates with the interior bearing surface of bushing 43. The block 45 may be restrained or held by plates 46 secured to the member 19. The impact member 45 engages the buffer spring 47, of any suitable form, but preferably, as indicated, of overlying leaf or plate springs held beneath the members 48 and between the tie rods 21, upon which are threaded the nuts 49, beneath which the members 48 are held.

The buffer spring is accordingly disposed outside of or beyond the motor unit proper and beyond the end member 19 and side handle structure 20, to or into which latter the several conductors 50 extend. The buffer being so disposed with respect to the end member 19 and particularly with respect to the handle structure 20 and the region or point to which the several conductors extend, the buffer spring is always in view of the operator, who may immediately detect breakage which may be repaired without disturbing the end member 19, handle 20 or the conductors.

Upon the tie rods 21, between the nuts 51 and 49 thereon, is confined the plate 52, upon which is secured by the bolts 53 the stem 54 of the upper handle 55.

For tamping and like operations, the operator grasps the side handle 20 with one hand and the upper handle 55 with the other, the control of the motor being effected by a switch controlled by the lever 56, Fig. 3, positioned upon or adjacent the handle grip 20ª and operated by the hand which grasps the member 20ª.

The arrangement above described is such that the buffer spring 47 is located between the upper handle 55 and the end member 19 or side handle 20.

A motor assembly of the character above described involves a minimum of threaded elements influenced materially by impact; the threaded tie rods 21, the cap screws 36, and to some extent the nuts 13 and 14, are affected by the impacts caused by the moving system, and these threaded elements are readily and cheaply replaceable should occasion require.

Referring to Fig. 8, there are shown alternating current supply conductors $a$, $b$ and $c$, delivering polyphase alternating current, for example, a two phase current. The current for phase A is delivered, for example, by the conductors $a$ and $b$, and the current for the phase B is delivered by conductors $b$ and $c$. In the case of the usual two phase current, the electro-motive-force waves of the two phases are in quadrature.

Across the conductors $a$ and $b$ is connected the primary of a transformer T provided with two secondaries delivering current, respectively, to the filaments or cathodes $f$ and $f^1$ of thermionic valves whose anodes or plates are indicated at $p$ and $p^1$. The valves are connected, respectively, in circuit with the windings 5 and 6, whose circuits are closed upon closure of switch $s$, of a reciprocating motor $M^1$ of any suitable structure, including the structure of the character here described, and utilized for striking the tamping tool 42, which operates upon the ballast or broken stone 57 to drive it to place, and particularly to tamp it under the railway tie 58, upon which are secured the rails 59. A similar motor $M^2$ may be thrown into parallel with the motor $M^1$, by closure of the switch 60, either through the same valves supplying motor $M^1$ or through a separate valve system connected to the same phase, whereby the tamping tools 42 of the two motors will be simultaneously struck by the moving systems or plungers of the two motors. This operation of the tamping or other tools 42, in phase with each other, is of advantage in various relations, as in tamping, and, as indicated in Fig. 10, for riveting, where the rivet sets 61 simultaneously strike the rivet 62 for securing the plates 63 and 64 to each other.

In tamping particularly this striking of the tamping tools at the same instants is of advantage, for the broken stone or ballast is the more readily and efficiently compacted and forced into position under a tie. This is particularly true when the two tamping bars 42 are used on opposite sides of and at the same end of a tie 58, which in Fig. 8 is shown in end view. It is understood, however, that the tamping tools may be struck at the same instants, though they be applied in different relative positions with respect to the tie.

Where it is desired that the tools, such as tamping bars, rivet sets or any other type of tool in any field of application of the motors, shall be struck at different instants, the motors may be operated out of phase, so to speak, causing impacts upon their associated tools at different instants, by connecting a second motor, for example, $M^2$, through the multiple switch 65, with switch 60 open, with similar valve structure supplied by phase B through conductors $b$ and $c$. In this case the tools 42, for example, will be struck the same number of times per unit of time, but not at the same instants.

In Fig. 9 the tie 58 and rails 59 are shown in plan with the motors $M^1$ and $M^2$ used at one end of the tie 58, on opposite sides thereof, causing either simultaneous or dissimultaneous actuation of the tools 42, depending upon whether the switch 60 be closed with switch 65 open, or the switch 65 closed and switch 60 open. Simultaneously, at the other end of the tie, on opposite sides thereof, there may be used tamping tools operated by the motors $M^3$ and $M^4$, whose tools 42 may be struck either simultaneously or at different instants.

Or two tools, driven, for example, by motors $M^1$ and $M^3$, on the same side of a tie, at opposite ends or at different positions longitudinally thereof, may have their tools 42 either simultaneously or dissimultaneously struck by the motor mechanism.

Or a pair of motors $M^2$ and $M^3$, on opposite sides of the tie, and at different positions longitudinally thereof, may have their tools 42 either simultaneously or dissimultaneously struck.

For procuring long high power strokes, the effectiveness of a motor increases in general with decrease in the frequency of the movement of the core or moving system. For efficient operation it is necessary that the moving system shall have given up substantially all of its kinetic energy by impact upon the tool and imparted to the moving system on its forward stroke by the motor winding, as 6, before there is exerted upon the moving system a force causing its return stroke, which force, generally, and in the example herein indicated, is applied by a second winding, such as 5. In reciprocating motors utilized for drilling stone or the like, short movement only of the tool is necessary, and high frequency operation is allowable and may be attained with either light or heavy moving cores or systems. In ballast or tie tamping, and like fields, however, the tool moves a considerable distance, and long stroke and high power are necessary. For long stroke, long air gap structure is desirable or essential in order that the movable core may be under the influence of the magnetic field for a longer interval of time. For high power strokes, the kinetic energy of the moving system should be great, and this depends upon two factors, the square of the velocity at the time of impact, and the mass of the moving system. Long stroke is favorable to high power in that the longer the stroke the more readily may the velocity reach a suitably high magnitude, since the acceleration period is longer, and for longer acceleration period longer air gap is required. It is preferred that of the kinetic energy ($.5mv^2$) the factor of velocity squared ($v^2$) shall predomiate over the mass factor ($m$), which means that high velocity is desirable with as light a moving system as consistent with procuring the desired kinetic energy. A light weight moving system is procurable by making the magnetizable core short and/or decreasing its cross section, but the cross section of the magnetizable core cannot be reduced too far, and should not be reduced to the point where excess magnetic saturation occurs. Long stroke and reduction of length of core are contributed to by bringing the two air gaps closer together, as described in connection with Fig. 1.

Proportions of the general character last above referred to are suited for long higher power strokes, in ballast or tie tamping, earth tamping, and other fields, when there is utilized in addition low frequency energization of the motor winding or windings. For ballast or tie tamping in particular, it has been found that the frequency of energization of the winding 6, or both windings 5 and 6 when both are used, should be at the rate of about 20 per second, and at any rate, should lie within the range from about 15 to about 27 per second. Too low frequency causes too heavy an impact, other things remaining the same, and in ballast or tie tamping this impact should not be allowed to attain a magnitude which fractures the broken stone or ballast. On the other hand, the frequency of operation should not be too high, for then the power of a blow or impact is too low. Within the range stated, and particularly at or about 20 strokes per second, best operation is obtainable.

This low frequency may be obtained by utilizing an alternating current whose frequency is equal to the frequency of operation of the moving system of the motor, or sources of higher frequency current may be utilized and several impulses grouped to effect low frequency motor operation. For a long high power stroke tool of the character herein described, operating at a frequency from about 15 to about 27 strokes per second, the stroke of the moving system is not less than $1\frac{1}{4}$ inches, nor in excess of $2\frac{1}{2}$ inches, the weight of the moving system not greater than four pounds and not less than two pounds, the ratio of the length of the magnetic core 24 itself to its diameter should fall within the limits of 3 to 2 and 3 to 1, and the ratio of the length of the air gap (between pole tips measured at the inside of the barrel 1) to the length of stroke should lie between 1 to 3 and 2 to 3. When these relations obtain, long high power strokes for ballast or tie tamping are available at proper frequency, with impact sufficiently great efficiently to perform the work and yet not fracture the broken stone or ballast.

For procuring suitably light weight or mass of the moving system, the magnetic core 24 may be circumferentially grooved intermediate its ends, as indicated in Fig. 1. Or it may otherwise be lightened, as by longitudinally extending grooves in its outer surface, which grooves serve also to lengthen the paths of waste currents induced in the core proper. It is preferable also in a system such as indicated in Fig. 1 that the diameter of the non-magnetic guide rods 25 and 26 should not be more than one-half the diameter of the core member 24. In general, the shorter the air gap, the greater may be the diameter of the non-magnetic guide rods with respect to the diameter of the magnetic core 24, with the proviso, however, that the cross section of the magnetic core shall not be made so small that excessive magnetic saturation occurs.

The farther apart the air gaps, the more the magnetizable core, as member 24, may be lightened by removal of material intermediate its ends, by circumferential or longitudinal groove or grooves or otherwise; that is, the greater the distance between the air gaps, which is the distance between opposite ends of the central pole tips 3ª, Fig. 1, the longer and/or deeper may be the groove or grooves between the ends of the core member 24 in reducing its weight. This is particularly of advantage to adapt a reciprocating motor of a given design or structure, suitable for operation at a given frequency, at a given voltage, to operate satisfactorily upon a supply circuit of lower voltage. At lower voltage the magnetic energy or forces are less, and, therefore, to maintain the velocity of the core or moving core system sufficiently high to procure the high power blow or impact, the core may be lightened by so removing material, or by removing still more material from a core which already has been grooved or similarly lightened. Under these circumstances of lightening of core, the velocity is maintained at the high order of magnitude desirable and the mass only is reduced whereby the desired high order of magnitude of blow or impact is substantially maintained.

As above indicated, for a portable motor or tool it is desirable that the weight be reduced by using materials of low specific gravity, such as aluminum alloy of the aforesaid character for the barrel 1, the annular nuts 13 and 14, the end members 16 and 19, and the handles 54, 55 and 20, and for the tool holder 35.

In addition, further substantial reduction in weight may be attained by using in lieu of copper for the conductor of the windings 5 and 6 a material, such as aluminum or aluminum alloy, having materially lower specific gravity than copper, and at the same time having higher specific electrical resistance than copper, thereby effecting an increase in the ratio of the inductance to the resistance of each winding, with consequent increased power factor and, when a common magnetic core member, as laminations 3, is utilized, the induction losses therein are also reduced, more particularly in that the overlap of the current waves in the two windings 5 and 6 is diminished.

By so utilizing aluminum conductor for the windings 5 and 6, and by utilizing aluminum alloy for the barrel and other parts of the apparatus, the weight is reduced from about 75 pounds, for example, to about 55 pounds, the reduction in weight being in excess of 25 per cent.

Furthermore, the utilization of aluminum or the like for the conductor of the windings 5 and 6 materially reduces their inertia well below that of copper windings, and in consequence, the aluminum windings are to far lesser degree subject to displacement or loosening incident to the repeated impacts of the moving system upon the tool and the impact block 45.

What I claim is:

1. A portable reciprocating motor comprising the combination with a reciprocating core system, electro-magnetic means for actuating said system, and structure enclosing them, of an operator's handle offset laterally from the path of movement of said core system and from said enclosing structure adjacent one end thereof, and a buffer spring receiving the impact of said core system and visibly disposed outside of said enclosing structure beyond said handle.

2. A portable reciprocating motor comprising the combination with a reciprocating core system, electro-magnetic means for actuating said system, and an enclosing casing therefor, of a closure member at one end of said casing, an operator's handle carried by said closure member and offset laterally from the path of movement of said core system and having a grip member disposed substantially in a plane normal to said path of movement of said moving system, and a buffer spring receiving the impact of said core system and visibly disposed beyond said handle outside of the motor.

3. A portable reciprocating motor comprising the combination with a reciprocating core system, electro-magnetic means for actuating said system, and structure enclosing them, of an operator's handle disposed adjacent one end of said enclosing structure, a second handle secured to the motor spaced from and disposed beyond the enclosing structure and said first named handle, and a buffer spring receiving the impact of said core system disposed exteriorly of said enclosing structure intermediate said handles.

4. A portable reciprocating motor comprising the combination with a reciprocating core system, electro-magnetic means for actuating said system, and structure enclosing them, of a member secured to said enclosing structure and spaced from one end thereof, a buffer spring visibly disposed between said member and said end of said enclosing structure and receiving the impact of said core system, and a handle carried by said member and disposed at a point more remote from the end of said closure structure than said spring.

5. A portable reciprocating motor comprising the combination with a reciprocating core system, electro-magnetic means for actuating said system, and an enclosing casing therefor, of a member for closing the end of said casing, tie rods for holding said end closure member to said casing, a second member secured by said tie rods, and a handle carried by said second member and disposed at a point more remote from said end closure member than said second member.

6. A portable reciprocating motor comprising the combination with a reciprocating core system, electro-magnetic means for actuating said system, and an enclosing casing therefor, of a member for closing the end of said casing, tie rods for holding said end closure member to said casing, a second member secured by said tie rods and spaced beyond said end closure member, a handle carried by said second member and disposed at a point more remote from said end closure member than said second member, and a buffer spring receiving the impact of said core system visibly disposed between said second member and said end closure member.

7. A portable reciprocating motor comprising the combination with a reciprocating core system, electro-magnetic means for actuating said system, and an enclosing casing therefor, of a member for closing the end of said casing, tie rods for holding said end closure member to said casing, a second member secured by said tie rods, a handle carried by said second member and disposed at a point more remote from said end closure member than said second member, and a side handle disposed substantially at right angles to said handle carried by said end closure member.

8. A movable core system for a reciprocating electric motor, comprising a magnetic core member, rod structure of non-magnetic manganese steel secured thereto and projecting beyond the end thereof, and a shoe of hard impact-resisting metal welded upon the impact end of said rod structure.

9. A movable core system for a reciprocating electric motor, comprising a magnetic core member having a bore, and rod structure of non-magnetic metal disposed in said bore and projecting beyond said core member, and a weld integrally joining said core member and said rod structure.

10. A reciprocating motor comprising the combination with a reciprocating core system, of a member within which the core system moves, magnetizable elements of a magnetic circuit disposed outside of said member, and clamping means secured to said member to hold said magnetizable elements, said clamping means being subdivided to reduce the current induced therein.

11. A reciprocating motor comprising the combination with a reciprocating core system, of a member within which the core system moves, magnetizable elements of a magnetic circuit disposed outside of said member, and clamping means extending circumferentially about the axis of movement of said core system and secured to said member for holding said magnetizable elements, said clamping means divided circumferentially into a circumferential series of clamping members for reducing the current induced therein.

12. A reciprocating motor comprising the combination with a reciprocating core system, of a member within which the core system moves, magnetizable elements of a magnetic circuit disposed outside of said member, and clamping means extending circumferentially about the axis of movement of said core system and secured to said member for holding said magnetizable elements, said clamping means divided circumferentially into a circumferential series of clamping members for reducing the current induced therein, each of said clamping members securing a plurality of groups of said magnetizable elements.

13. A reciprocating motor comprising the combination with a reciprocating core system, of an actuating winding therefor, a member within said winding and within which the core system moves, magnetizable elements of a magnetic circuit disposed outside of said member, and clamping means secured to said member to hold said magnetizable elements, said member being subdivided circumferentially of the axis of movement of said core system for reducing the current induced in said member.

14. A reciprocating motor comprising the combination with a reciprocating core system, of a member within which the core system moves, magnetizable elements of a magnetic circuit disposed outside of said member, and clamping means secured to said member and holding said magnetizable elements, said clamping means and said member being subdivided cimcumferentially of the axis of movement of said core system, the subdivisions of said member and said clamping means being so positioned with respect to each other circumferentially of said axis of movement of said core system as to reduce the induced current.

15. A reciprocating motor comprising a tubular member, a reciprocating core system movable therein, the exterior of said tubular member being polygonal to afford a plurality of circumferentially spaced flat faces, and a group of magnetic field laminations abutting edgewise against each of said faces.

16. A reciprocating motor comprising a tubular member, a reciprocating core system movable therein, the exterior of said tubular member being polygonal to afford a plurality of circumferentially spaced flat faces, groups of magnetic field laminations extending substantially parallel with the axis of movement of said core system and abutting edgewise against said faces, and a clamping member common to a plurality of said groups of laminations and secured directly to said tubular member.

17. The combination with a reciprocating motor having a reciprocating core system and electro-magnetic means for actuating the same, of a bearing member for guiding said core system, a tool holder secured to said motor, a tool having a shank disposed in said holder, a collar on said shank, and means for positioning said bearing member and limiting the movement of said tool with respect to said tool holder.

18. A reciprocating motor comprising a movable core system, electro-magnetic means for actuating the same, and a tubular member within which said core system reciprocates, clamping means secured to said member and holding said electro-magnetic means, said tubular member consisting of metal of low specific gravity and of a relatively high specific resistance as compared with copper, whereby the weight of the motor is decreased and induced current losses reduced.

19. A reciprocating motor comprising a reciprocating core system, and an energizing winding therefor of conductor having low specific gravity and high specific resistance as compared with copper.

20. A reciprocating motor comprising a reciprocating core system, and an energizing winding therefor of conductor of aluminum.

21. A reciprocating motor comprising a reciprocating core system, a plurality of energizing windings, and a magnetizable structure forming an element common to the magnetic circuits of said windings, said windings constituted of conductor having low specific gravity and specific high resistance as compared with copper.

22. A reciprocating motor comprising a reciprocating core system, a plurality of energizing windings, and a magnetizable structure forming an element common to the magnetic circuits of said windings, said windings constituted of aluminum conductors.

23. A reciprocating motor comprising a tubular metallic member of low specific gravity and having a relatively high specific resistance, a core system movable within said tubular member, magnetic field laminations disposed outside of said tubular member, a winding of aluminum conductor operatively related with said laminations and said core system, clamping members on said tubular member between which said laminations and said winding are held, whereby there is formed a unit comprising said tubular member, laminations and said winding.

24. A reciprocating motor comprising a tubular member of aluminum alloy, a core system movable within said tubular member, magnetic field laminations disposed outside of said tubular member, a winding of aluminum conductor operatively related with said laminations and said core system, and members on said tubular member between which said laminations and said winding are held, whereby there is formed a unit comprising said tubular member, laminations and said winding.

25. A reciprocating motor for producing long high power strokes, comprising a magnet system having closely spaced air gaps, a relatively light core system having a long stroke, and electro-magnetic means for accelerating the core system, said means bearing such relation to the mass of said core system that the velocity imparted thereto is relatively high.

26. A reciprocating motor for producing long high power strokes, comprising a magnet system having closely spaced air gaps, a relatively light core system having a long stroke, electro-magnetic means for actuating said core system, and a source of current for energizing said electro-magnetic means to produce from about 15 to about 27 strokes of said core system per second and to accelerate said core system within a stroke to a relatively high velocity.

27. A reciprocating motor for producing long high power strokes, comprising a magnet system having a plurality of closely adjacent air gaps, a relatively light reciprocating core system comprising a short magnetic core member producing a long stroke, electro-magnetic windings producing, respectively, magnetic fluxes in said air gaps and effecting acceleration of said core system to a relatively high velocity.

28. A percussive tool comprising a ballast tamper or other tool to be operated with long high power strokes, a reciprocating motor comprising a moving core system for impacting the tamper or other tool, said core system having a weight lying within the range from about two to about four pounds, a magnet system having an air gap of such length as to effect a stroke of said system lying within the range from about 1¼ inches to about 2½ inches, and winding structure for energizing said magnet system.

29. A percussive tool comprising a ballast tamper or other tool to be operated with long high power strokes, a reciprocating motor comprising a moving core system for impacting the tamper or other tool, said core system having a weight lying within the range from about two to about four pounds, a magnet system having an air gap of such length as to effect a stroke of said system lying within the range from about 1¼ inches to about 2½ inches, winding structure for energizing said magnet system, and a source of current for energizing said winding to cause said core system to make a number of strokes per second lying within the range from about 15 to about 27 per second.

30. A percussive tool comprising a ballast tamper or other tool to be operated with long high power strokes, a reciprocating motor comprising a moving core system for impacting the tamper or other tool, said core system having a weight lying within the range from about two to about four pounds, the ratio of the length of the magnetic core member of said system to its diameter falling within the range from about 1.5 to about 3, a magnet system having an air gap of such length as to effect a stroke of said system lying within the range from about 1¼ inches to about 2½ inches, and winding structure for energizing said magnet system.

31. A percussive tool comprising a ballast tamper or other tool to be operated with long high power strokes, a reciprocating motor comprising a moving core system for impacting the tamper or other tool, said core system having a weight lying within the range from about two to about four pounds, the ratio of the length of the magnetic core member of said system to its diameter falling within the range from about 1.5 to about 3, a magnet system having an air gap of such length as to effect a stroke of said system lying within the range from about 1¼ inches to about 2½ inches, winding structure for energizing said magnet system, and a source of current for energizing said winding to cause said core system to make a number of strokes per second lying within the range from about 15 to about 27 per second.

32. The combination of a movable core member, and a stop member to receive the impact of said core member provided with a lubricating passage therethrough.

33. A reciprocating motor comprising a movable core member, a tubular member within which said core moves, a sleeve member engaging said tubular member, means abutting said sleeve to position it with respect to said tubular member, and a tool having a shank guided by said sleeve member.

34. A reciprocating motor comprising a movable core system, a tubular member within which said core moves, a bearing member, a sleeve member engaging said tubular member, means abutting said sleeve to position said sleeve and bearing members within said tubular member, and a member carried by said sleeve member to guide a tool shank.

35. An electric motor of the reciprocating type, comprising a reciprocating impact element disposed to strike a working tool on its forward stroke, actuating means therefor, and a resilient buffer comprising a plurality of leaf springs for absorbing a substantial amount of energy from the impact element.

36. An electric motor of the reciprocating type comprising operating mechanism including an impact element, an enclosing casing therefor and a handle secured thereto, and a buffer for the impact element disposed externally of the casing and within the handle opening.

37. An electric motor of the reciprocating type comprising a movable impact member and actuating means therefor enclosed in a casing, a handle for the casing as a unit, and a buffer disposed underneath the handle and outside of the casing and provided with a guard for the buffer to preclude injury to an operator's hand in case of damage to the buffer.

38. An electric motor of the reciprocating type comprising a movable impact element, actuating means therefor, a buffer consisting of a plurality of leaf springs to absorb the energy of the impact element on its backward stroke, and an impact block resting against the springs and disposed in the path of the impact element to be struck thereby.

39. An electric motor of the reciprocating type comprising a movable impact element, actuating means therefor, a leaf spring buffer for the impact element, an impact block for transmitting the energy of the impact element to the buffer, and means for holding the block between the buffer and the impact element.

40. A reciprocating motor comprising a core, means for reciprocating said core comprising a winding structure, groups of magnetizable elements of a magnetic circuit associated with said winding structure, each of said groups of elements having pole tips disposed adjacent said core and spaced, respectively, unequal distances from the ends of said winding structure.

41. A reciprocatory motor comprising a core, and means for reciprocating said core comprising at least three groups of magnetizable elements, each including a component extending longitudinally of said core and a row of pole tips extending circumferentially thereof, intermediate and end rows of said pole tips being spaced, respectively, unequal distances from their components extending longitudinally of said core.

42. A reciprocatory motor comprising a core, and means for reciprocating said core comprising at least three groups of magnetizable elements, each including a component extending longitudinally of said core and a row of pole tips extending circumferentially thereof, an end row of said pole tips being spaced a greater distance from its longitudinal component than is an intermediate row from its longitudinal component.

43. A motor comprising a core whose movement is unrestrained while moving toward impact-delivering position with respect to a tool, means for reciprocating the core, a housing for the core, and a buffer disposed exteriorly upon the housing and adapted to absorb energy from the core upon movement thereof from impact-delivering position.

44. A motor comprising a core whose movement is unrestrained while moving toward impact-delivering position with respect to a tool, means for reciprocating the core, a housing for the core, and a web-like buffer disposed exteriorly upon the housing transversely of the path of the core and adapted to absorb energy therefrom when it moves from impact-delivering position.

45. A motor comprising a reciprocatory core, means for reciprocating the core, a housing for the core, and means for absorbing energy from the core upon movement thereof in one direction comprising a web-like buffer extending transversely of the path of the core and whose ends are secured to said housing exteriorly thereof.

46. A motor comprising a reciprocatory core, means for reciprocating the core, a housing for the core, and means for absorbing energy from the core upon movement thereof in one direction comprising a web-like laminated spring buffer extending transversely of the path of the core and whose ends are secured to said housing exteriorly thereof.

47. A reciprocating motor comprising the combination with a reciprocating core system, of a member within which the core system moves, and magnetizable elements of a magnetic circuit disposed around said member and having pole tips extending therethrough and lying substantially flush with its internal bore.

48. A reciprocating motor comprising the combination with a reciprocating core system, of a member within which the core system moves, and groups of magnetizable elements of a magnetic circuit disposed around said member, each group having pole tips extending therethrough and lying substantially flush with its internal bore.

49. A reciprocating motor comprising the combination with a reciprocating core system, of a member within which the core system moves, magnetizable elements of a magnetic circuit disposed around said member and having pole tips extending therethrough and lying substantially flush with its internal bore, a winding for said magnetizable elements, and a casing enclosing said winding and elements.

50. A reciprocating motor comprising a tubular barrel, bearings carried by said barrel, a reciprocating core having extensions slidable in said bearings, and magnetizable elements of a magnetic circuit disposed around said barrel and having pole tips extending therethrough and lying substantially flush with its internal bore.

51. A reciprocating motor comprising a tubular barrel, bearings carried by said barrel, a reciprocating core having extensions slidable in said bearings, groups of magnetizable elements of a magnetic circuit disposed around said barrel, each of said groups having pole tips extending through said barrel and lying substantially flush with its internal bore, a winding for two of said groups of magnetizable elements, and a second winding for another of said groups of magnetizable elements and one of said two groups.

52. A reciprocating motor comprising the combination with a reciprocating core system, of a member within which the core system moves, groups of magnetizable elements of a magnetic circuit disposed around said member, a spacing plate between two of said groups, and means co-acting with said member for forcing one of said last-named groups against said spacing plate.

53. A reciprocating motor comprising the combination with a reciprocating core system, of a member within which the core system moves, a group of magnetizable elements of a magnetic circuit disposed around said member adjacent its end, a second group of magnetizable elements disposed around said member in a region removed from its end, a spacing plate between said groups, and means co-acting with said member for forcing said first-named group of elements against said spacing plate.

54. A reciprocating motor comprising the combination with a reciprocating core system, of a member within which the core system moves, a group of magnetizable elements of a magnetic circuit disposed around said member adjacent its end, a second group of magnetizable elements disposed around said member in a region removed from its end, a spacing plate between said groups, a ring threaded to said member for forcing said first-named group of elements against said spacing plate, and means for preventing rotative movement of said ring.

55. The combination with a reciprocating motor having a reciprocating core system and electromagnetic means for actuating the same, of a casing of magnetizable material for said means, a detachable plate adjacent said electromagnetic means for closing each end of said casing, and means for securing said plates and casing together.

56. The combination with a reciprocating motor having a reciprocating core system and electromagnetic means for actuating the same, of a casing of magnetizable material for said means, a plate closing each end of said casing, and means comprising tie rods extending through said plates for securing them to said casing.

57. A reciprocatory motor comprising a core, and means for reciprocating said core including groups of magnetizable elements forming parts of a magnetic circuit, spaced pole tips on said elements, forming an air gap in said magnetic circuit, said magnetizable element extending unequal distances longitudinally of said core so that said air gap is disposed towards one of said groups of magnetizable elements.

58. In a reciprocatory motor, a field structure surrounding a movable core member comprising a winding and group of magnetizable elements, pole tips on said elements forming air gaps in a plurality of magnetic circuits, said pole tips being disposed towards one group of magnetizable elements for the purpose of shortening the distance longitudinally of said core between the respective air gaps.

59. The combination with a motor comprising a core system and reciprocating means therefor, of a casing for said means, handle structure clamped to said casing, and a member of deformable material interposed between the handle structure and casing.

60. The combination with a motor comprising a core system and reciprocating means therefor, of a casing for said means, handle structure clamped to said casing, and a fibre disc interposed between the handle structure and casing.

61. A reciprocating motor comprising the combination with a reciprocating core system, of a tubular member within which it moves, magnetic field elements outside of said member extending longitudinally thereof, and metallic clamping means engaging said field elements for holding them in predetermined fixed relation with respect to said tubular member.

62. A reciprocating motor comprising the combination with a reciprocating core system, of a tubular member within which the core system moves, magnetizable elements of a magnetic circuit disposed outside of said member, said elements constituting L-shaped members having one leg thereof extending longitudinally of said tubular member, and non-magnetic metallic securing means engaging said longitudinally extending legs and positioning the same with respect to said tubular member.

63. A reciprocating motor comprising the combination with a reciprocating core system, of a tubular member within which the core system moves, groups of magnetizable elements disposed outside of said member having components extending both radially and longitudinally of said tubular member, and clamping means for engaging both the longitudinally extending components and the tubular member for relatively positioning the same.

64. A reciprocating motor comprising the combination with a reciprocating core system, of a tubular member within which the core system moves, groups of magnetizable elements disposed outside of said member having components extending both radially and longitudinally of said core system, said longitudinal components comprising magnetic poles having pole tips offset with respect thereto for interlocking with said tubular member, and clamping means engaging said poles and tubular member for relatively positioning the same.

65. A reciprocating motor comprising the combination with a reciprocating core system, of a tubular member within which it moves, groups of magnetizable laminæ spaced circumferentially and longitudinally of said tubular member, the laminæ of longitudinally spaced groups projecting toward each other longitudinally of said tubular member in pole-forming elements, and clamp structure secured to said tubular member and engaging said pole-forming elements to hold them in predetermined fixed position with respect to said tubular member.

66. A reciprocating motor comprising the combination with a reciprocating core system, of a tubular member within which the core system moves, groups of magnetizable elements disposed outside of said member having components extending both radially and longitudinally of said core system, said longitudinal components comprising pole pieces co-operating to form air gaps, clamping means bridging said air gaps and engaging said opposing pole pieces, and means for securing said clamping means with respect to said tubular member.

67. A reciprocating motor comprising the combination with a reciprocating core system, of a tubular member within which the core system moves, magnetizable elements disposed outside of said member having components extending both radially and longitudinally of said core system, said longitudinal components terminating in beveled faces adjacent an air gap, and wedge-shaped clamping means engaging said faces and cooperating with said tubular member to position said magnetizable elements.

68. A portable reciprocatory motor comprising a barrel, shock-absorbing mechanism disposed adjacent one end of said barrel comprising a bearing bushing supported therein, a buffer member and a buffer spring, and a core reciprocatory in said barrel, said core having a reduced end portion freely slidable within said bearing bushing.

69. The combination with a reciprocating motor having a reciprocating core system and a housing therefor, of front and rear end plates at each end of said housing, means for holding said end plates fixed with respect to said housing, a bushing movable in one of said end plates, an element in said bushing actuated by said core, and a resilient member limiting the movement of said bushing with respect to said one of said end plates.

CARL S. WEYANDT.

CERTIFICATE OF CORRECTION.

Patent No. 1,680,311.            Granted August 14, 1928, to

CARL S. WEYANDT.

It is hereby certified that error appears in the printed specification of the above numbered patent requiring correction as follows: Page 2, line 106, for the word "tapping" read "tamping"; page 7, line 78, for "inductance" read "resistance", and line 79, for "resistance" read "inductance"; page 9, line 66, claim 21, for the words "specific high" read "high specific"; and that the said Letters Patent should be read with these corrections therein that the same may conform to the record of the case in the Patent Office.

Signed and sealed this 13th day of August, A. D. 1929.

(Seal)                            M. J. Moore,
                                     Acting Commissioner of Patents.